(12) United States Patent
Meier

(10) Patent No.: US 8,671,971 B2
(45) Date of Patent: Mar. 18, 2014

(54) SYSTEMS AND METHODS FOR PROVIDING A MONITORING AND DEACTIVATION APPARATUS FOR A BEVERAGE DISTRIBUTION SYSTEM

(76) Inventor: Michael Meier, Milwaukee, WI (US)

( * ) Notice: Subject to any disclaimer, the term of this patent is extended or adjusted under 35 U.S.C. 154(b) by 111 days.

(21) Appl. No.: 13/218,180

(22) Filed: Aug. 25, 2011

(65) Prior Publication Data

US 2012/0048397 A1    Mar. 1, 2012

Related U.S. Application Data

(60) Provisional application No. 61/402,165, filed on Aug. 25, 2010.

(51) Int. Cl.
  *F16K 17/00*    (2006.01)
(52) U.S. Cl.
  USPC ........... 137/460; 137/462; 137/557; 137/559; 137/601.18; 137/601.2
(58) Field of Classification Search
  USPC ............ 137/460, 461, 462, 557, 559, 599.11, 137/601.18, 601.2, 613
  See application file for complete search history.

(56) References Cited

U.S. PATENT DOCUMENTS

| 2,085,628 | A | * | 6/1937 | Brannan .................... 303/84.1 |
| 2,390,749 | A | * | 12/1945 | Swift ........................ 137/519.5 |
| 2,778,223 | A | * | 1/1957 | Kimbrell .................... 73/861.55 |
| 3,139,902 | A | * | 7/1964 | Thomas ........................ 137/557 |
| 4,613,851 | A | | 9/1986 | Hines |
| 4,874,116 | A | | 10/1989 | Fallon et al. |
| 4,928,850 | A | | 5/1990 | Fallon et al. |
| 5,868,162 | A | | 2/1999 | Dickerson, Jr. |
| 6,514,564 | B2 | | 2/2003 | de Almeida Botelho et al. |
| 6,536,456 | B2 | | 3/2003 | Dickerson, Jr. et al. |
| 6,763,843 | B1 | | 7/2004 | Dickerson, Jr. et al. |
| 7,000,629 | B1 | | 2/2006 | Lucas, Jr. et al. |
| 7,032,606 | B1 | | 4/2006 | Lucas, Jr. et al. |
| 7,145,467 | B2 | | 12/2006 | Abel et al. |
| 7,174,783 | B2 | | 2/2007 | McSheffrey, Jr. et al. |
| 7,717,294 | B2 | | 5/2010 | Bodemann |
| 2006/0283877 | A1 | * | 12/2006 | Bodemann ....................... 222/53 |
| 2007/0120692 | A1 | | 5/2007 | McSheffrey, Jr. et al. |
| 2008/0084306 | A1 | | 4/2008 | Durtschi et al. |

* cited by examiner

*Primary Examiner* — John Rivell
*Assistant Examiner* — Reinaldo Sanchez-Medina
(74) *Attorney, Agent, or Firm* — Ryan Kromholz & Manion, S.C.

(57) ABSTRACT

An apparatus for indicating a leak in a beverage dispensing system and sealing a leak in a beverage dispensing system includes a deactivating means including a channel, a sealing ball, a sealing element and a reset means. The sealing ball and sealing element are located within the channel. When a leak is present, the sealing ball is moved from its resting position. Once the leak reaches a predetermined level, the sealing ball is pressed against the sealing element by the force of the gas in the chamber. This seals the chamber and prevents further gas flow through the system.

12 Claims, 5 Drawing Sheets

SYSTEMS AND METHODS FOR PROVIDING A MONITORING AND DEACTIVATION APPARATUS FOR A BEVERAGE DISTRIBUTION SYSTEM

RELATED APPLICATIONS

This application claims the benefit of U.S. Provisional Patent Application Ser. No. 61/402,165, filed 25 Aug. 2010.

BACKGROUND OF THE INVENTION

Gas is often utilized to distribute beverages such as soda or beer. Particularly with respect to soda distribution, gas is provided to a syrup pump. Generally, the syrup pump exhausts gas in short burst, once every few seconds while being used. Occasionally, the syrup pump will malfunction for various reasons. For example, the syrup source may be empty and the syrup pump may be unable to detect the vacuum state. Such malfunction may cause the syrup pump to operate much more frequently than usual and in some cases even almost continuously. Such continuous operation will simply run down the supply of gas until the tank is empty. This is not desirable because the gas will need to be replaced more often than normal. It is therefore desirable to provide an apparatus that provides a visual indication of leaks in a gas distribution system and stops gas flow when a leak is severe.

SUMMARY OF THE INVENTION

The present invention provides system and methods for deactivating gas flow from a gas source to a beverage dispensing system.

One aspect of the invention provides a gas deactivation apparatus including a gas deactivating means and a visual gas flow indication means in parallel fluid communication with the gas deactivating means.

The gas deactivating means of the invention may include a first chamber having a first end and a second end, a sealing ball disposed within the first chamber, the sealing ball being movable between a first resting position at the first end of the first chamber and a second engaged position at the second end of the first chamber, and a sealing element disposed within the first chamber at the second end of the first chamber.

The invention may include the sealing ball abutting the sealing element forming an airtight seal when the sealing ball is in its second engaged position.

The visual gas flow indication means of the invention may include a second chamber having a first end and a second end, a visual indicator disposed within the second chamber, the visual indicator being movable between a first resting position at the first end of the second chamber and a second engaged position, and a biasing means disposed within the second chamber at the second end of the second chamber.

The visual gas flow indication means of the invention may include a flow restrictor, a check valve in parallel fluid communication with the flow restrictor, and a pressure gauge in fluid communication with, and downstream from, the flow restrictor and the check valve.

The apparatus of the invention may include a bypass valve in parallel fluid communication with the gas deactivating means, the bypass valve also being in fluid communication with, and downstream from, the visual gas flow indication means.

The apparatus of the invention may include a reset valve.

Another aspect of the invention provides a gas deactivation apparatus including a flow restrictor and a check valve in parallel fluid communication with the flow restrictor. The invention further includes a pressure gauge in fluid communication with, and downstream from, the flow restrictor and the check valve. The invention further includes a sealing chamber, the sealing chamber having a first end and a second end, the sealing chamber being in fluid communication with, and downstream from, the flow restrictor and check valve. The invention further includes a sealing ball disposed within the first chamber, the sealing ball being movable between a first resting position at the first end of the first chamber and a second engaged position at the second end of the first chamber. The invention further includes a sealing element disposed within the first chamber at the second end of the first chamber. The invention further includes a bypass valve in parallel fluid communication with the sealing chamber, the bypass valve being operable between a first closed configuration and a second open configuration.

Another aspect of the invention provides a system including a gas source, a deactivation apparatus in fluid communication with the gas source, and a beverage distribution system downstream from the deactivation apparatus, in fluid communication with the deactivation apparatus.

The deactivating apparatus of the system may include at least one gas deactivating means and at least one visual gas flow indication means in parallel fluid communication with the gas deactivating means.

The gas deactivating means of the system may include a first chamber, the chamber having a first end and a second end, a sealing ball disposed within the first chamber, the sealing ball being movable between a first resting position at the first end of the first chamber and a second engaged position at the second end of the first chamber, and a sealing element disposed within the first chamber at the second end of the first chamber.

The system may include the sealing ball abutting the sealing element and forming an airtight seal when the sealing ball is in its second engaged position.

The visual gas flow indication means of the system may include a second chamber having a first end and a second end, a visual indicator disposed within the second chamber, the visual indicator being movable between a first resting position at the first end of the second chamber and a second engaged position, and a biasing means disposed within the second chamber at the second end of the second chamber.

The visual gas flow indication means of the system may include a flow restrictor, a check valve in parallel fluid communication with the flow restrictor, and a pressure gauge in fluid communication with, and downstream from, the flow restrictor and the check valve.

The system may include a bypass valve in parallel fluid communication with the gas deactivating means, the bypass valve also being in fluid communication with, and downstream from, the visual gas flow indication means.

The system may include a reset valve.

The deactivating apparatus further of the system may include a flow restrictor, a check valve in parallel fluid communication with the flow restrictor, and a pressure gauge in fluid communication with, and downstream from, the flow restrictor and the check valve. The system may further include a sealing chamber, the sealing chamber having a first end and a second end, the sealing chamber being in fluid communication with, and downstream from, the flow restrictor and check valve. The system may further include a sealing ball disposed within the first chamber, the sealing ball being movable between a first resting position at the first end of the first chamber and a second engaged position at the second end of the first chamber. The system may further include a sealing element disposed within the first chamber at the second end of the first chamber. The system may further include a bypass valve in parallel fluid communication with the sealing chamber, the bypass valve being operable between a first closed configuration and a second open configuration.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
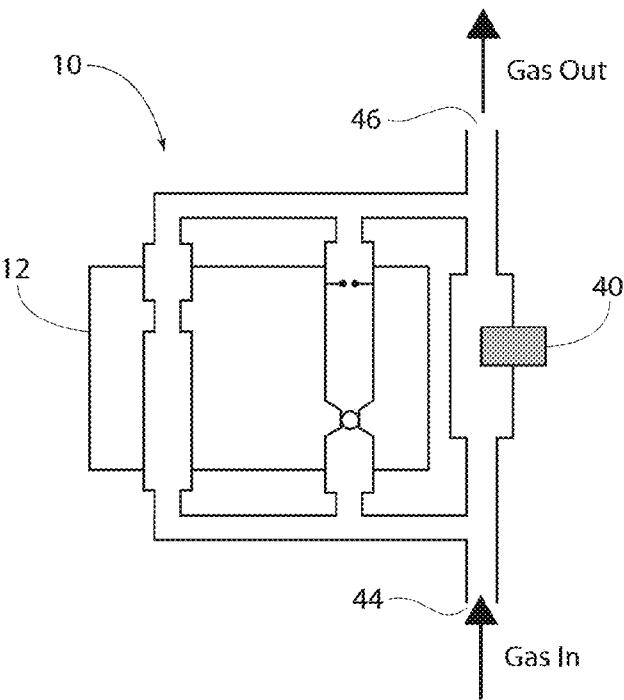
FIG. 1 is a simplified schematic of a system including an embodiment of an apparatus according to the present invention.
Figure 2:
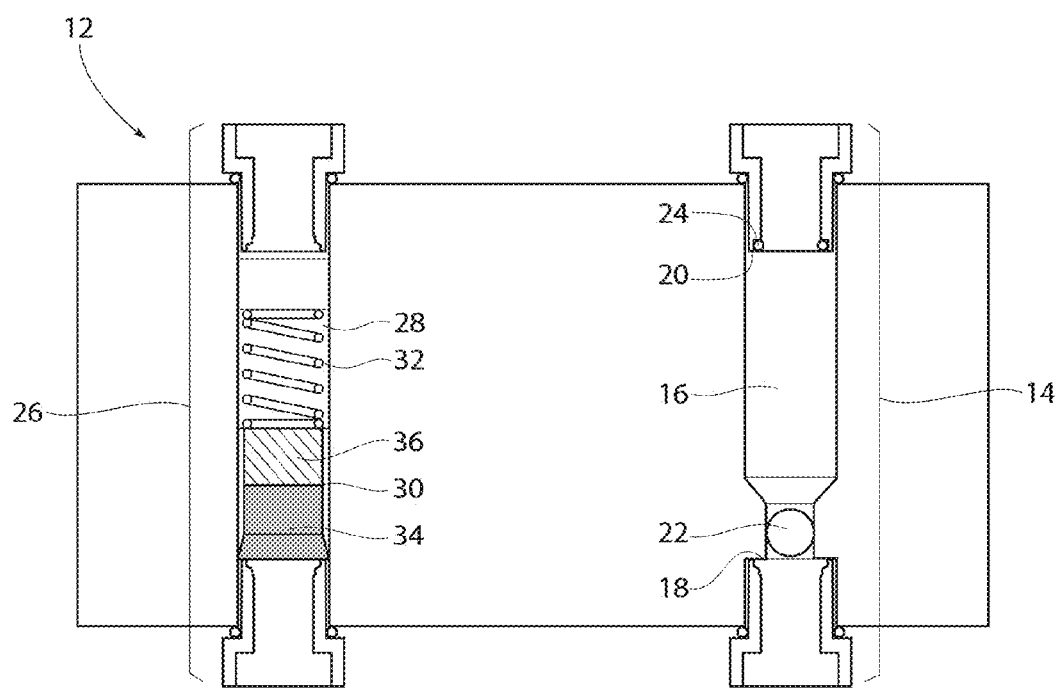
FIG. 2 is a schematic of a system including an embodiment of an apparatus according to the present invention.

FIG. 1 shows a schematic of a system 10 including an embodiment of a deactivation apparatus 12 according to the present invention. The system has a gas inlet 44 and a gas outlet 46. The embodiment of the deactivation apparatus 12 is shown in more detail in FIG. 2. The deactivation apparatus 12 includes at least one deactivating means 14. In the illustrated embodiment the deactivating means 14 takes the form of a chamber 16 having a first end 18 and a second end 22 with a sealing ball 22 and a sealing element 24, in the illustrated embodiment an o-ring, disposed inside the chamber 16. The sealing element 24 is preferably located near the second end 20 of the chamber 16. In the illustrated embodiment the sealing ball 22 is made of plastic, however it is contemplated that it may be made of any material known in the art which allows a gas-tight seal between the sealing ball 22 and the sealing element 24. In its resting position, as shown in FIG. 2, the sealing ball 22 sits at the first end 18 of the chamber 16. As gas flows into the chamber 16, the sealing ball 22 is forced out of its resting position and into the lower portion of the chamber 16, thus indicating a small to moderate gas leak. If a large leak is occurring, the sealing ball 22 will travel further up in the chamber 16. When an excessive leak occurs, the sealing ball 22 travels all the way to the second end 20 of the chamber 16 and seats against the sealing element 24. This causes the gas flow through the chamber 16 to stop, keeping pressure high upstream side of the sealing ball 22 and the pressure to decrease on the downstream side of the sealing ball 22. The chamber 16 and the sealing ball 22 may be sized to determine the size of leak that the required to seal the chamber 16. For example, a heavier ball 22 would require more pressure, or a larger leak, to cause the sealing ball 22 to be seated against sealing element 24 and seal the chamber 16.

It is contemplated that if desired, the deactivation apparatus 12 may include a visual gas flow indication means 26 for providing a visual indication of the gas flow, in addition to stopping the flow when the flow becomes excessive. The illustrated embodiment of FIGS. 1 and 2 includes visual gas flow indication means 26 taking the form of a second chamber 28 including a visual indicator 30. The visual indicator 30 is preferably biased in a normal resting position (as shown in FIG. 2) by biasing means 32. In the illustrated embodiment the biasing means 32 take the form of a spring, but the biasing means 32 can take any form known in the art. The visual indicator 30 preferably includes a first portion 34 and a second portion 36. The deactivation apparatus 12 preferably includes a visible section (not shown) at the chamber 28 through which at least a portion of the visual indicator can be viewed. When the visual indicator 30 is in its resting position (as shown in FIG. 2), the first portion 34 of the visual indicator 30 would be visible through the visible section. When the visual indicator 30 is in its engaged position, the second portion 36 of the visual indicator 30 would be visible.

The visual indicator 30 may be multi-colored and/or include a written indicator. For example, the first portion 34 of the visual indicator 30, which is shown when the indicator 30 is in its resting position, may be green and the second portion 36 of the visual indicator 30, which shows when the indicator 30 is in the engaged position, may be red. Alternatively, the first portion 34 of the visual indicator 30 (shown when in its resting position) may include text indicating that the system is ok and the second portion 36 of the visual indicator 30 (shown when in its engaged position) may include text indicating that there is a problem in the system.

The second chamber 28 is preferably arranged in parallel to the first chamber 16. When a large pressure differential occurs in the system 10 due to a leak in the system and the engagement of the deactivating means 14 sealing of the first chamber 1, the visual indicator 30 is pressed against the force of the biasing means 32 by the force of the pressure in the system 12. The position of the visual indicator 30 shows whether the flow of gas to the dispensing system 38 has been stopped. When the second portion 36 of the visual indicator 30 is visible, the flow of gas has been stopped by deactivating means 14, which in the illustrated embodiment is the engagement of the sealing ball 22 with the sealing element 24 in the first chamber 16.

Preferably, the deactivating system 10 may be reset. In the illustrated embodiment, the deactivating system 10 is reset by opening a reset valve 40 that is in a parallel relationship with the deactivating means 14 (in the illustrated embodiment the first chamber 16) and, if utilized, the flow indicator means 26 (in the illustrated embodiment the second chamber 28). By opening up the reset valve 40, gas is allowed to flow to the beverage distribution system 38. If the leak in the beverage distribution system 38 has been fixed, the pressure upstream and downstream in the deactivating system 10 is equalized. When the downstream pressure is reduced, the deactivating means 14 disengages. In the illustrated embodiment of FIG. 2, the sealing ball 22 in the first chamber 16 would return to its resting position (as shown in FIG. 2) by the force of gravity and the visual indicator 30 returned to its resting position (as shown in FIG. 2) by the force of the biasing means 32. With the deactivating system 10 reset, the reset valve 40 would be closed and the system will be operational again. It is contemplated that the reset valve 40 could either be an integral part of the deactivation apparatus 12, or could be separately arranged in parallel as shown in the system 10 schematic of FIG. 1.

Figure 3:
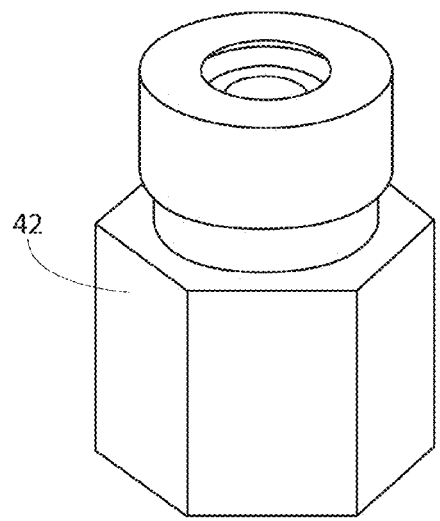
FIG. 3 is a perspective view of an embodiment of a fitting for use with an apparatus according the present invention.
Figure 4:
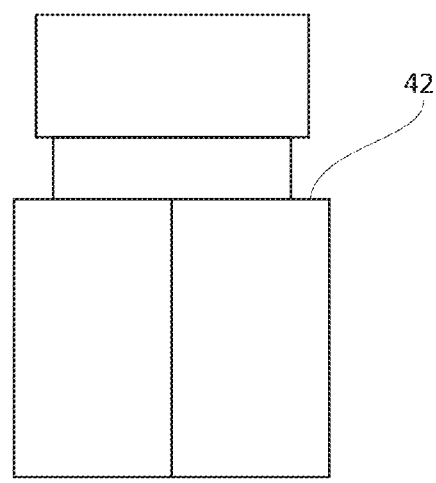
FIG. 4 is a cross sectional view of the fitting of FIG. 3.

FIGS. 3 and 4 show an embodiment of a fitting 42 that may be used to couple the apparatus 14 of the present invention to a beverage distribution system 38 and gas inlet (not shown).

It is contemplated that the embodiment of the deactivating system 10 and apparatus 12 shown in FIGS. 1 and 2 could be utilized on a gas distribution system that feeds multiple gas lines. It is contemplated that the system 10 and apparatus 12 of FIGS. 1 and 2 could be placed upstream of a manifold (not shown) splitting separate gas lines. However, it is also contemplated that the apparatus 12 shown in FIGS. 1 and 2 could be utilized on a gas distribution system with a single gas line, or on each individual gas line of a multiple line system.

Figure 5:
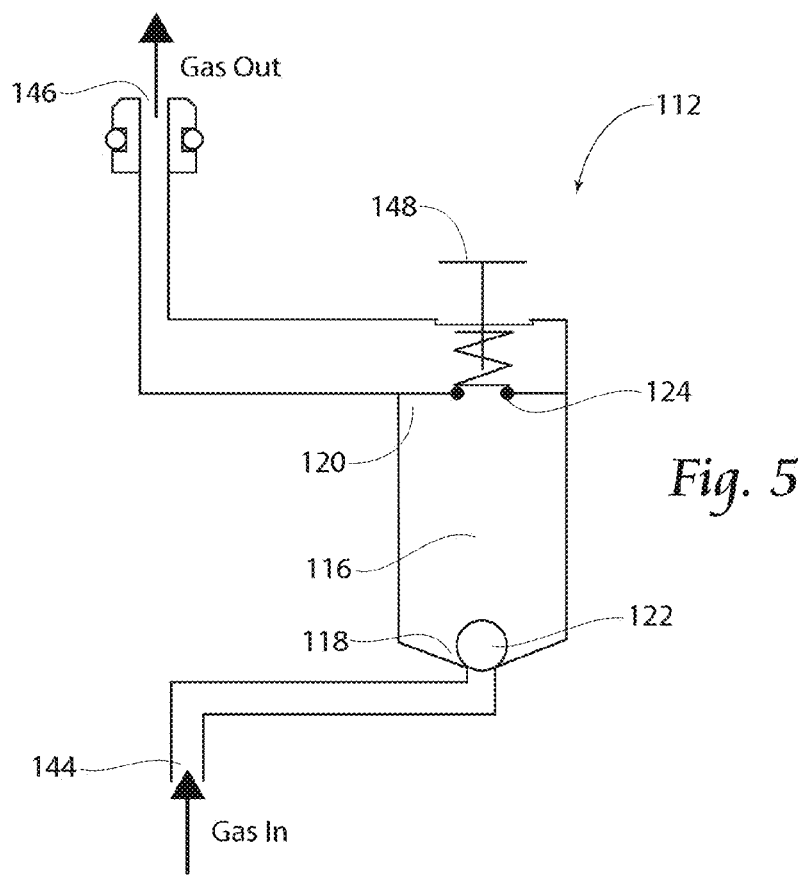
FIG. 5 is a schematic of an alternative embodiment of an apparatus according to the present invention.

FIG. 5 shows an alternate embodiment of the apparatus 112 of the present invention which is sized and configured to be used on an individual gas line. The embodiment of FIG. 5 includes a chamber 116 having a first end 118 and a second end 120, a sealing ball 122, a sealing element 124 and a reset means 140. As with the previous embodiment, when an excessive leak occurs, the sealing ball 122 travels from its resting position at the first end 124 of the chamber 116 (as shown in FIG. 5) all the way to the second end 120 of the chamber 116 and seats against the sealing element 124. In the illustrated embodiment the reset 140 means takes the form of a plunger which, when depressed pushes the sealing ball 122 out of engagement with the sealing element 124 and allows for airflow through the apparatus 112 to equalize pressure on the upstream 144 and downstream 146 sides of the sealing ball 122.

Figure 6:
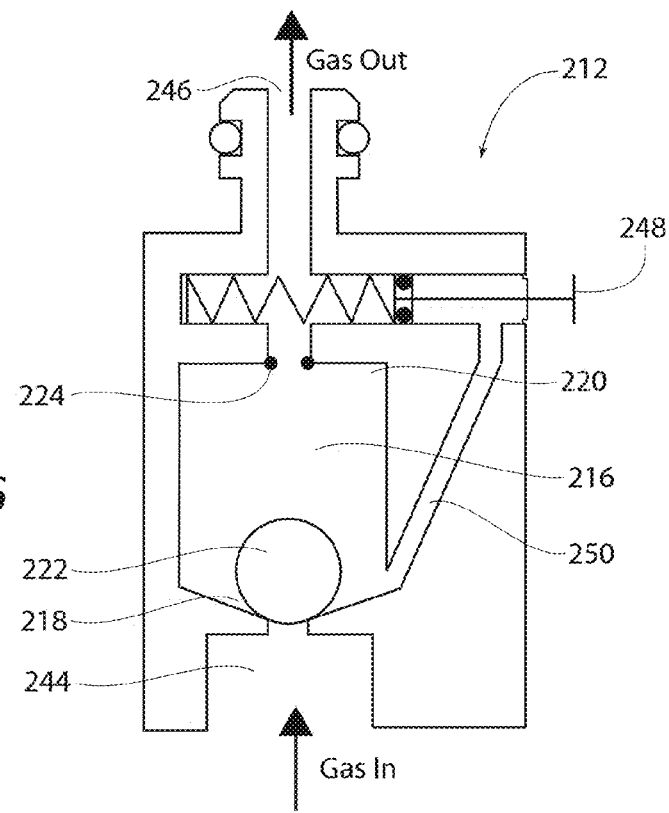
FIG. 6 is a schematic of an additional alternative embodiment of an apparatus according to the present invention.
Figure 7:
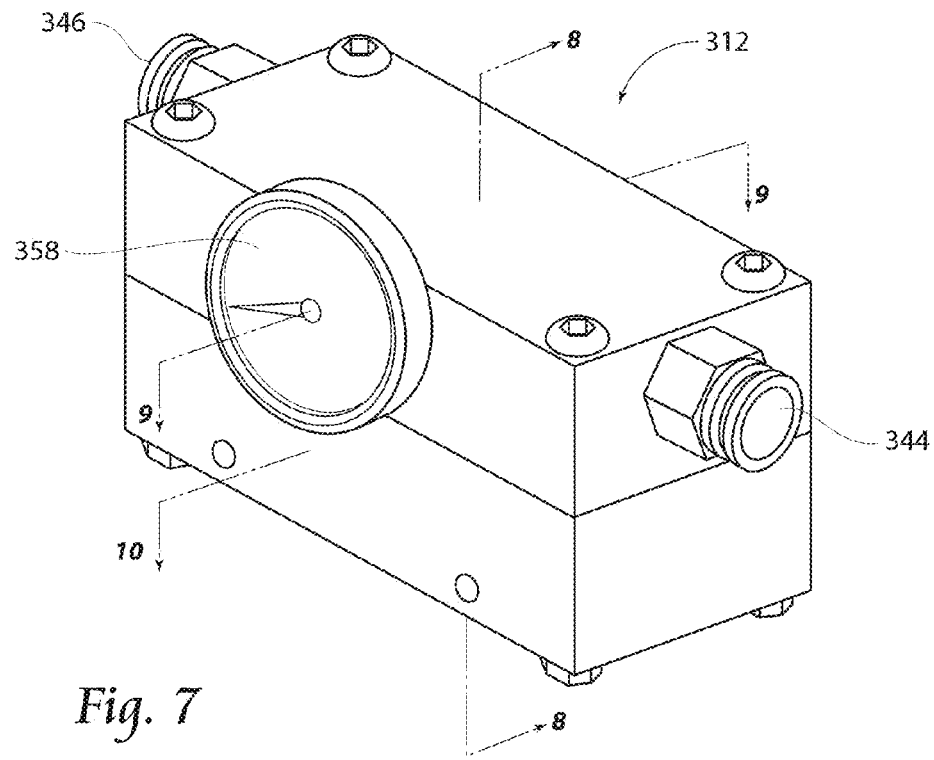
FIG. 7 is a perspective view of an alternative embodiment of an apparatus according to the present invention.

FIG. 6 shows an additional alternate embodiment of the apparatus 212 of the present invention which is sized and configured to be used on an individual gas line. The embodiment of FIG. 6 includes a chamber 216 having a first end 218 and a second end 220, a sealing ball 222, a sealing element 224, and a reset means 240. As with the previous embodiments, when an excessive leak occurs, the sealing ball 222 travels from is resting position at the first end 218 of the chamber 216 (shown in FIG. 6) to the second end 220 of the chamber 216 and seats against the sealing element 224. In the illustrated embodiment the reset 240 means takes the form of a plunger 248 and a diversion channel 250. When the plumber 248 is depressed, air can flow through the diversion channel 250 to equalize pressure on the upstream 244 and downstream 246 sides of the sealing ball 242. The sealing ball 242 will then return to its resting position (as shown in FIG. 6) through gravity.

FIGS. 7 through 10 show an alternative embodiment of a deactivation apparatus 312 of the present invention including deactivating means 314 and gas flow indicator means 326. In the illustrated embodiment of FIGS. 7 through 10 the gas flow indicator means 326 is arranged in series with the downstream deactivating means 314. The gas flow indicator means 326 takes the form of a flow restrictor 352 arranged in parallel relationship with a check valve 354, the flow restrictor 352 and check valve 354 being downstream from a gas source (not shown). The deactivating means 314 takes the form of a chamber 316 having a first end 318 and a second end 320 with a sealing ball 322 and a sealing element 324, in the illustrated embodiment an o-ring, disposed inside the chamber 316. In the illustrated embodiment, the deactivating means 314 is arranged in parallel relationship with a bypass valve 356. A pressure gauge 358 is preferably arranged in series with the chamber 316, and located downstream from the chamber 316.

It should be understood that the components may be coupled using any means known in the art including, but not limited to, standard gas lines.

In the illustrated embodiment, gas enters the apparatus 312 at a predetermined pressure. In the illustrated embodiment the gas is supplied to the apparatus 312 at approximately 50 psi. However, it should be understood that any gas supply pressure known in the art may be utilized. The gas flow is split such that the flow restriction 352 and the check valve 354 are arranged in parallel. The gas flowing through the restriction 352 then travels towards the deactivating means 314. The greater the gas flow, the more the pressure drops after the flow restrictor 352. It should be understood that the pressure gauge 358 can used to provide a visual indication of a leak in the downstream 346 beverage distribution system (not shown). Specifically, anytime the pressure on the pressure gauge 358 between is less than the initial input pressure (which, as outlined above, in the illustrated embodiment is 50 psi), it is an indication that there is a leak in the beverage distribution system. For example, if the gas input is 50 psi and the gauge reads 40 psi, a gas flow must be present. The degree of the leak is indicated by the size of the restrictor 352 and the amount of pressure drop indicated by the gauge 358.

To prevent the beverage dispensing system (not pictured) from coming under pressure, a check valve 354 is placed in parallel to the flow restrictor 352. The check valve 354 may take any form known in the art. The check valve 354 opens and allows flow therethrough where there is a predetermined pressure behind the check valve 354. This is known as the cracking pressure, and in the illustrated embodiment the cracking pressure is preferable 20 psi. It should be understood that the cracking pressure in the illustrated embodiment may be modified by changing the resistance of the biasing means 332 or the weight of the ball 360. In this manner, when there is a leak in the downstream 346 beverage distribution system, the output pressure is allowed to fall to 30 p.s.i., at which point the check valve 354 opens and allows essentially unrestricted flow through the gas flow indicator means 326 to the deactivating means 314.

Figure 8:
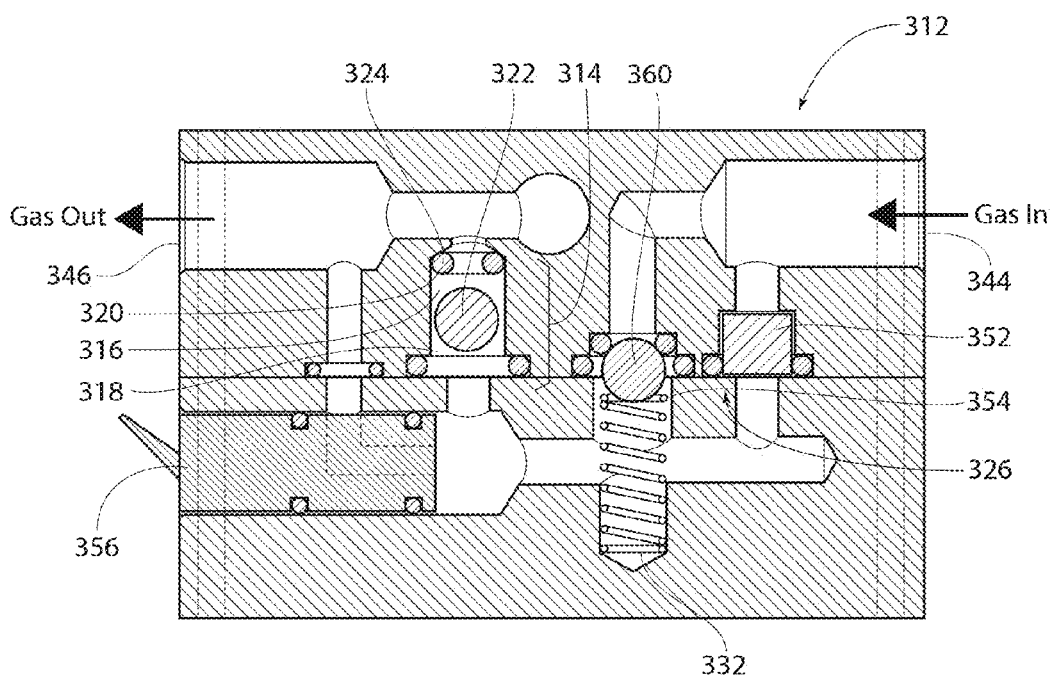
FIG. 8 is a cross sectional view of the apparatus of FIG. 7 taken along line 8-8.
Figure 9:
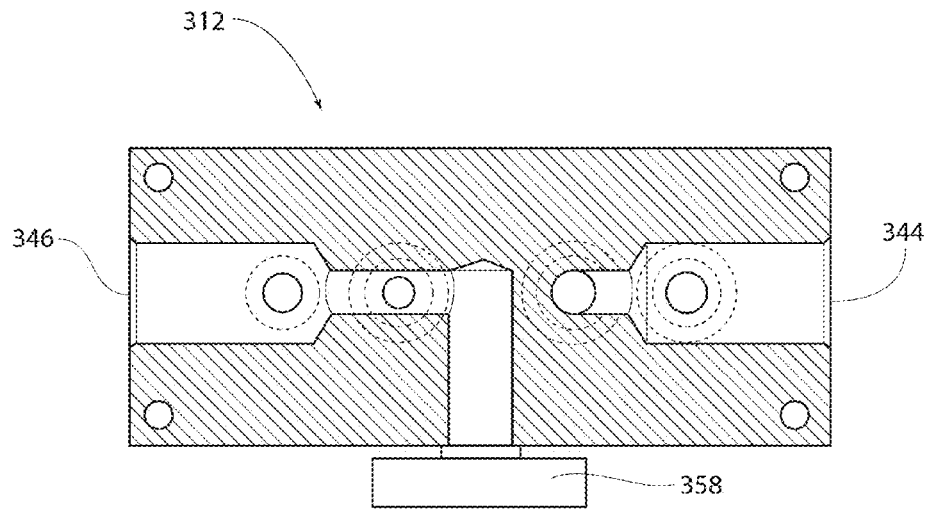
FIG. 9 is a cross sectional view of the apparatus of FIG. 7 taken along line 9-9.
Figure 10:
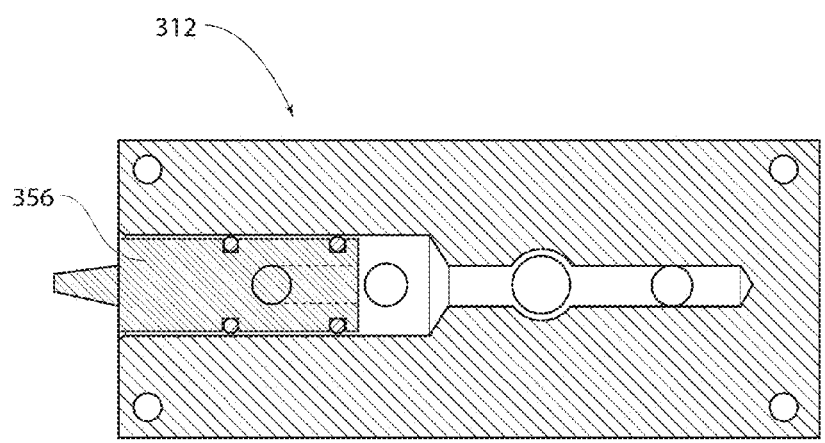
FIG. 10 is a cross sectional view of the apparatus of FIG. 7 taken along line 10-10.

The deactivating means 314 operates as described above. The chamber 316 preferable has a first end 318 and a second end 320. The sealing element 324 is preferably located near the second end 320 of the chamber 316. In its resting position (as shown in FIG. 8), the sealing ball 322 sits at the first end 318 of the chamber 316. As gas flows into the chamber 316, the sealing ball 322 is forced out of its resting position. If a leak is occurring, the pressure upstream 344 from the sealing ball will be higher than the pressure downstream. This pressure differential will cause the sealing ball 322 to travel up in the chamber towards the second end 320. When the pressure differential reaches a predetermined level (which would indicate an excessive leak), the sealing ball 322 travels all the way to the second end 320 of the chamber and seats against the sealing element 324. This causes the gas flow through the chamber 316 to stop, keeping pressure high upstream side of the sealing ball 322 and causing the pressure to decrease on the downstream side of the sealing ball 322. The chamber 316 and the ball 322 may be sized to determine the size of leak that the required to seal the chamber 316. For example, a heavier ball would require more pressure, or a larger leak, to cause the ball 322 to be seated against sealing element 324 and seal the chamber 316.

The bypass valve 356 is preferably is a normally closed position. In this manner, when the sealing ball 322 is seated against the sealing element 324, the gas flow to the downstream 346 beverage dispensing system is disengaged. However, the bypass valve 356 may be opened to allow gas to bypass the chamber 316 and provide gas to the downstream 346 beverage dispensing system. This will allow the user to dispense beverages even though there is a leak in the system. It should be understood that once the leak in the beverage dispensing system is fixed, the pressure in the downstream 346 beverage dispensing system will be re-pressurized and the sealing ball 322 will return to its original position.

Figure 11:
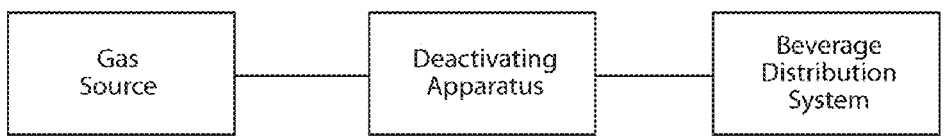
FIG. 11 is a simplified schematic of a system including an apparatus according to the present invention.

FIG. 11 is a simplified schematic showing how the deactivating apparatus 12,112,212,312 interacts with the beverage distribution system. In use, the deactivating apparatus 12,112, 212,312 is positioned downstream from the gas source and upstream from the beverage distribution system to deactivate the gas flow when there is a leak system.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A gas deactivation apparatus comprising:
   at least one gas deactivating means; and
   at least one visual gas flow indication means in parallel fluid communication with the gas deactivating means, wherein the visual gas flow indication means further comprises:
   a flow restrictor;
   a check valve in parallel fluid communication with the flow restrictor; and
   a pressure gauge in fluid communication with, and downstream from, the flow restrictor and the check valve.

2. The apparatus of claim 1 wherein the gas deactivating means further comprises:
   a first chamber, the chamber having a first end and a second end;
   a sealing ball disposed within the first chamber, the sealing ball being movable between a first resting position at the first end of the first chamber and a second engaged position at the second end of the first chamber; and
   a sealing element disposed within the first chamber at the second end of the first chamber.

3. The apparatus of claim 2 wherein the sealing ball abuts the sealing element forming an airtight seal when the sealing ball is in its second engaged position.

4. The apparatus of claim 1 further comprising a bypass valve in parallel fluid communication with the gas deactivating means, the bypass valve also being in fluid communication with, and downstream from, the visual gas flow indication means.

5. The apparatus of claim 1 further comprising a reset valve.

6. A gas deactivation apparatus comprising:
   a flow restrictor;
   a check valve in parallel fluid communication with the flow restrictor;
   a pressure gauge in fluid communication with, and downstream from, the flow restrictor and the check valve;
   a sealing chamber, the sealing chamber having a first end and a second end, the sealing chamber being in fluid communication with, and downstream from, the flow restrictor and check valve;
   a sealing ball disposed within the first chamber, the sealing ball being movable between a first resting position at the first end of the first chamber and a second engaged position at the second end of the first chamber;
   a sealing element disposed within the first chamber at the second end of the first chamber; and
   a bypass valve in parallel fluid communication with the sealing chamber, the bypass valve being operable between a first closed configuration and a second open configuration.

7. A system comprising:
   a gas source;
   a deactivation apparatus in fluid communication with the gas source, the deactivation apparatus comprising at least one gas deactivating means and at least one visual gas flow indication means in parallel fluid communication with the gas deactivating means; and
   a beverage distribution system downstream from the deactivation apparatus, in fluid communication with the deactivation apparatus,
   wherein the visual gas flow indication means further comprises:
   a flow restrictor;
   a check valve in parallel fluid communication with the flow restrictor; and
   a pressure gauge in fluid communication with, and downstream from, the flow restrictor and the check valve.

8. The system of claim 7 wherein the gas deactivating means further comprises:
   a first chamber, the chamber having a first end and a second end;
   a sealing ball disposed within the first chamber, the sealing ball being movable between a first resting position at the first end of the first chamber and a second engaged position at the second end of the first chamber; and
   a sealing element disposed within the first chamber at the second end of the first chamber.

9. The system of claim 8 wherein the sealing ball abuts the sealing element forming an airtight seal when the sealing ball is in its second engaged position.

10. The system of claim 7 further comprising a bypass valve in parallel fluid communication with the gas deactivating means, the bypass valve also being in fluid communication with, and downstream from, the visual gas flow indication means.

11. The system of claim 7 further comprising a reset valve.

12. A system comprising:
   a gas source;
   a deactivation apparatus in fluid communication with the gas source; and
   a beverage distribution system downstream from the deactivation apparatus, in fluid communication with the deactivation apparatus, wherein the deactivation apparatus comprises:
   a flow restrictor;
   a check valve in parallel fluid communication with the flow restrictor;
   a pressure gauge in fluid communication with, and downstream from, the flow restrictor and the check valve;
   a sealing chamber, the sealing chamber having a first end and a second end, the sealing chamber being in fluid communication with, and downstream from, the flow restrictor and check valve;
   a sealing ball disposed within the first chamber, the sealing ball being movable between a first resting position at the first end of the first chamber and a second engaged position at the second end of the first chamber;
a sealing element disposed within the first chamber at the second end of the first chamber; and
a bypass valve in parallel fluid communication with the sealing chamber, the bypass valve being operable between a first closed configuration and a second open configuration.

* * * * *